United States Patent Office.

MRS. R. L. JONES, OF SACRAMENTO, CALIFORNIA.

Letters Patent No. 82,122, dated September 15, 1868; antedated May 6, 1868.

IMPROVED COMPOSITION FOR MAKING DESIGNS UPON FABRICS.

*The Schedule referred to in these Letters Patent and making part of the same.*

TO ALL WHOM IT MAY CONCERN:

Be it known that I, Mrs. R. L. JONES, of the city and county of Sacramento, and State of California, have invented and produced a new, original, and improved Method of Making Coloring-Powder to be Used in Stamping Cloth for the Purpose of Embroidering; and I do hereby declare that the following is a full and exact description thereof. Said powder resembles fine black dust.

To enable others to make and use my invention, I will proceed to describe its composition.

It is to be made by combining a certain quantity of pulverized rosin with an equal quantity of black soot from pine or other material that will produce the same. Said properties to be thoroughly mixed and perfumed. Said powder to be used by placing the same on the cloth through a perforated paper, and applying a warm flat-iron.

What I claim as my invention, and desire to procure my Letters Patent on, is—

The composition of rosin and soot, perfumed as above described, and for the purpose set forth.

MRS. R. L. JONES.

Witnesses:
    A. G. WATERHOUSE,
    WM. M. GOODYEAR.